US006628029B2

(12) United States Patent
Astegno

(10) Patent No.: US 6,628,029 B2
(45) Date of Patent: Sep. 30, 2003

(54) DRIVE FOR A ROLLER SHUTTER WINDING TUBE

(76) Inventor: Paolo Astegno, Via Lessolo 30, 10010, Alice Superiore, (TO) (IT)

( * ) Notice: Subject to any disclaimer, the term of this patent is extended or adjusted under 35 U.S.C. 154(b) by 78 days.

(21) Appl. No.: 09/816,267

(22) Filed: Mar. 23, 2001

(65) Prior Publication Data

US 2002/0145349 A1 Oct. 10, 2002

(30) Foreign Application Priority Data

Apr. 6, 2000 (IT) ........................................ MI00A0738

(51) Int. Cl.$^{7}$ ................................................ H02K 49/02

(52) U.S. Cl. ......................... 310/105; 310/106; 310/98; 310/99

(58) Field of Search ................................. 310/105, 106, 310/102 A, 99, 98, 93, 94, 123; 160/310, 314, 315, 243; 318/254, 439

(56) References Cited

U.S. PATENT DOCUMENTS 3,257,572 A 6/1966 Ludemann et al. ......... 310/190
4,194,266 A 3/1980 Natzel ........................... 16/99
4,417,185 A * 11/1983 Bullat ........................... 318/2
5,729,102 A * 3/1998 Gotou et al. ................ 318/254
5,847,525 A 12/1998 Cheron et al. .............. 318/468

FOREIGN PATENT DOCUMENTS

| | | | | |
|---|---|---|---|---|
| DE | 3222770 A1 | 6/1982 | ........... | E06B/9/204 |
| DE | 3636855 A1 | 10/1988 | ........... | E06B/9/204 |
| EP | 0521709 A | 1/1993 | ............. | H02P/6/02 |
| FR | 0784 146 A | 7/1997 | ............. | E06B/9/82 |
| FR | 2775729 | 3/1999 | ............. | E06B/9/17 |
| FR | WO 00/49264 | 8/2000 | ............. | E06B/9/88 |

* cited by examiner

*Primary Examiner*—Thanh Lam
(74) *Attorney, Agent, or Firm*—Law Office of I. Ionescu; I. Ionescu

(57) ABSTRACT

A control device for rotating a tube supporting a roller member to be wound onto or unwound from the tube has at least one electric motor housed in the tube and drive mechanism for transmitting the motion from the motor to the supporting tube. The motor is an electric three phase motor having at least four poles. The drive mechanism preferably has a single-stage mechanical reduction gear such as a planocentric reduction gear.

9 Claims, 5 Drawing Sheets

DRIVE FOR A ROLLER SHUTTER WINDING TUBE

FIELD OF INVENTION

The present invention relates to a drive device incorporating an electric motor for actuating a roller shutter winding tube, for winding and unwinding roll-up members, such as roller-blinds, rolling shutters, sunblinds and the like.

BACKGROUND OF THE INVENTION

Control devices are known on the market for using an electric motor to drive the winding and unwinding of roll-up members. Control devices of this type are disclosed for example in DE 32 22 770, DE 36 36 855, FR-A-2 775 729, U.S. Pat. No. 5,847,525, WO 00/49264. Additionally U.S. Pat. No. 4,194,266 discloses the use of a planocentric gear assembly in an adjustable roller mechanism for a sliding closure having a case attachable to the sliding closure.

The general structure of these known drive or control devices is illustrated in FIGS. 1 and 2, and substantially comprises an electric motor M, a gear reduction unit R, an electromagnetic (eddy-current) brake unit E and a unit for adjusting the limit switch positions. These components of the control device, as clearly shown in the Figures, are mounted aligned inside of a single winding tube I from one end of which the drive shaft C of the reduction gear protrudes while the other end is rigidly fastened to a first external constraint A1, such as for example the masonry supporting the roller shutter box of a roller-blind. The tube T is therefore subjected to a torsion stress equal to the torque applied when raising the roller member and is designed taking into account the maximum torque supplied by the motor M.

The drive shaft C of the reduction gear, through a pulley to which it is keyed, transmits the rotary motion to a winding tube H on which the roller member is wound or from which it is unwound, with the tube being supported by a friction bearing B1 and by a rolling-contact bearing B2 secured to the tube T and to a second external constraint A2, respectively. On its outer ring the bearing B1 further supports an annular member or crown S for adjusting and centering the tube H inside the tube T. In the known devices the motor M is a single-phase asynchronous motor equipped with two windings, in order to obtain the rotation in both directions. When the motor M is fed, the drive shaft of the reduction gear rotates the pulley G. In turn, pulley G rotates tube H, thus allowing the winding or unwinding of a roller member having one end secured through conventional means to the outer side wall of tube H.

The eddy-current brake unit E is kept in an engagement position by the action of spring means, and is electromagnetically released when electrical power is supplied to the motor M thus allowing the rotation of the motor and the winding/unwinding of the roller member on/from the winding tube.

The control device is completed by a limit switch unit F, usually consisting of one microswitch for each direction of rotation, receiving information about the angular position of the tube H through a thread rod system inside the limit switch unit, with such a system being mechanically controlled by the rotation of the annular member S. The adjustment of the limit switch is achieved by means of screws laterally located on the annular member S or by means of equivalent systems. This way, the limit switch positions of the roller shutter winding tube are established with a maximum accuracy larger than plus or minus 15 degrees of the rotation (angle) of the roller member. In other known systems of limit switch units there are provided electronic systems with an ON/OFF function and in case there is provided for a limitation of the power supplied with a very narrow correction range, in the order of about −30% of the maximum power. In such a case the positioning accuracy of the limit switch can be improved up to a value of about plus or minus 5 to 6 degrees of rotation of the tube H.

These known control devices show nevertheless some drawbacks, among which a loud noise, a low efficiency of operation of the electric motor and a reduced useful life when no maintenance is carried out. Because of these drawbacks, the marketplace acceptance of the devices has been hindered.

The noise is substantially due to the presence of a mechanical speed reduction gear, which is unavoidable for reducing the rotation speed of single-phase electric motors used for these applications, from their standard speed of about 2,000 rpm to the lower speed required to drive the roller shutter winding tube (10–25 rpm). In most cases these reduction gears comprise a planetary three-stage reduction gear units of the type illustrated in the FIGS. 1 and 2. Due to the large number of small-size mechanical parts and/or parts rotating at a high speed, and partially because of an extreme cost-reduction policy (mainly affecting the quality of the materials and the machining tolerances), the reduction gears are source of loud noise and vibrations. Such noise and vibrations increase with the increase of the load applied and with the wear and tear of the device and are further strongly amplified because of their typical location inside of the roller shutter boxes for roller-blinds, generating a so-called resonant, "sound box" effect. This is a source of difficulty, especially in domestic applications and when the shutters are moved in the evening and night.

The (low) efficiency of the motor-reduction gear assembly is determined both by the type of the electric motor employed and by the presence of the reduction gear, and is in the order of 10–15% of the drawn power. In addition to a large power consumption, this low efficiency causes motor overheating, thus severely limiting the time for which a device can be continuously operated to a maximum duration of 4–5 minutes. Because of this limitation, there are negative consequences in some application fields such as for example the driving of large sunblinds or roller shutters that are wound on small diameter tubes. An increase of the maximum operation time of the motor would be particularly welcome to guarantee the possibility of carrying out an efficient "emergency" drive under the control of safety devices (for example in the so-called "wind safety" for sunblinds or more generally under the control of signals coming from photocells or similar devices), intervening after a number of consecutive drives that have already increased the motor temperature.

Finally, in the known devices, the mechanical reduction gear is the main cause of a relatively short useful life. This short life is typical for a device operating with satisfactory performance and without maintenance, as it is the case in domestic applications.

The wear of the mechanical rotating parts in the reduction gear frequently induces the generation of loud noise, forcing the replacement of the device or a complete servicing operation after a short operating time.

SUMMARY OF THE INVENTION

It is therefore an object of the present invention to provide a drive device for roller shutter winding tubes that is free from the above drawbacks, and more particularly a device generating low noise after a long use, that provides for a better efficiency and therefore causing a low overheating and allowing longer continuous operation times and a maintenance-free, longer useful life.

The above and other objects of the present invention are achieved through a control device for rotating a supporting tube of a roller member to be wound onto or unwound from said tube, said device comprising at least an electric motor housed in said supporting tube and drive means comprising a reduction gear unit for transmitting the rotation from said motor to said supporting tube, wherein said electric motor comprises at least four poles.

Said electric motor is a three-phase electric motor and said device incorporates an electronic unit for feeding in a controlled manner electric power to said motor. Said drive means comprises a single-stage mechanical reduction gear. Said single stage mechanical reduction gear is a planocentric reduction gear comprising a ring gear provided with a given number of teeth, eccentrically and idly mounted on the output shaft of said motor and connected to the output shaft of said reduction gear, said gear wheel meshing with the internal teeth of a stationary ring gear, the number of said internal teeth being greater than said given number, preferably by one tooth.

Additional features of the invention will become evident from the following description of non-limiting embodiments thereof illustrated with reference to the attached drawings.

DESCRIPTION OF THE PREFERRED EMBODIMENT

Figure 1:
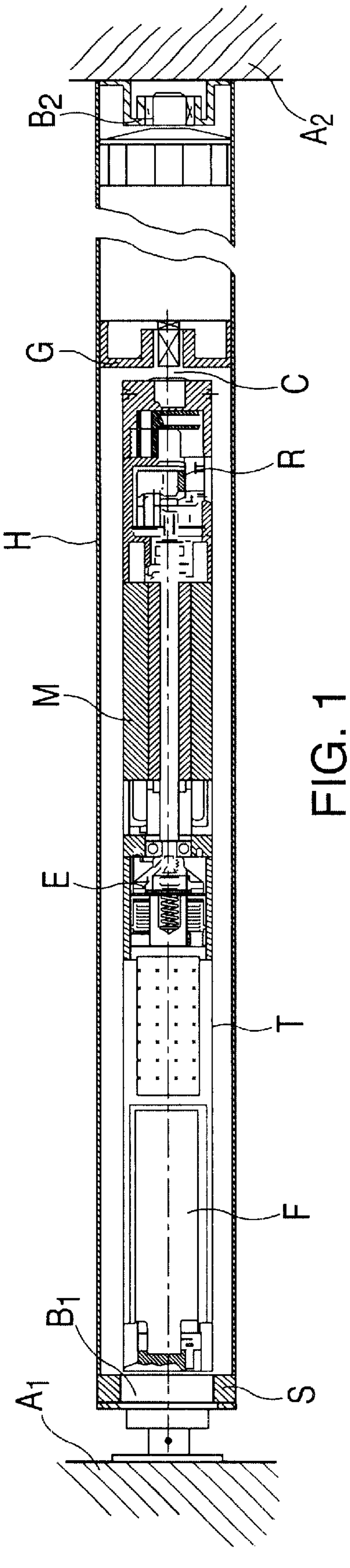
FIG. 1 PRIOR ART
FIG. 1, already discussed, is a side cross-section view of a known control device for roller shutter members fitted inside a tube for winding and supporting the roller shutter member.
Figure 2:
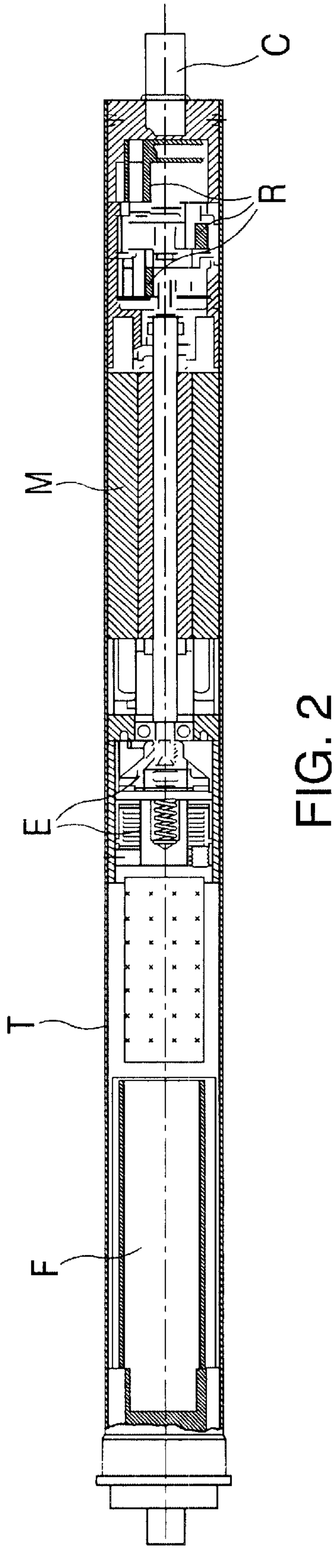
FIG. 2 PRIOR ART
FIG. 2 is an enlarged side cross-section view of the control device shown in FIG. 1.
Figure 3:
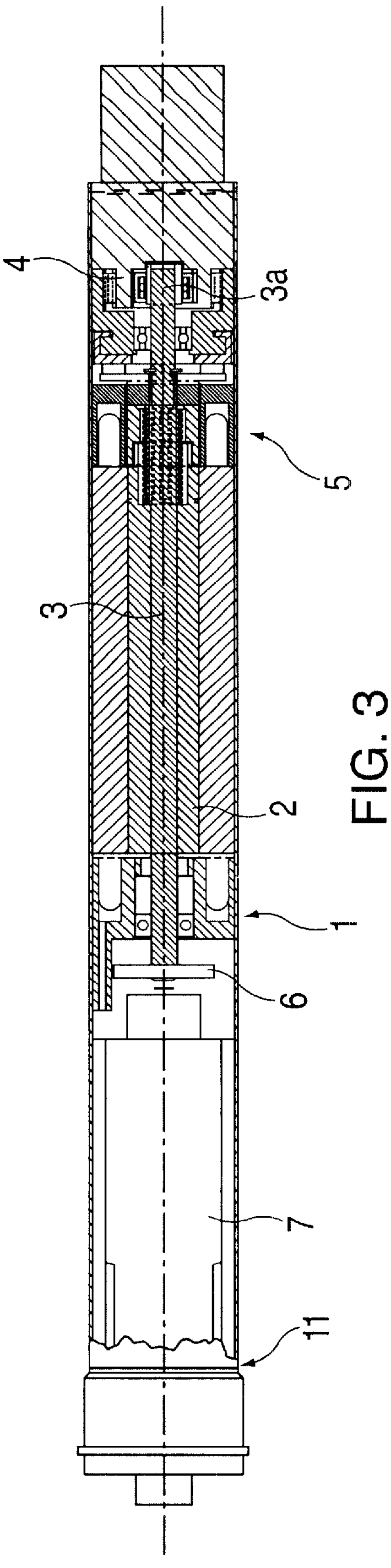
FIG. 3 is a view similar to the one of FIG. 2, illustrating a control device according to this invention.

An embodiment of the control device according to the invention, schematically illustrated in FIG. 3, substantially comprises a tube 1, an electric motor 2 housed within the tube 1, a drive shaft the end 3*a* of which moves a reduction gear unit 4, a brake unit 5 mounted on said shaft 3, a detector of the angular position of shaft 3, for example an optical or magnetic encoder, and a power supply and management electronic unit 7 for feeding and controlling the motor 2.

According to the invention, the motor 2 is a multi-pole (i.e. comprises more than two poles) motor and is preferably a four-pole motor in order to obtain a rotation speed of the motor shaft 3 at least equal to half of the speed of the conventional motors used for these applications. Moreover, in accordance with a preferred embodiment of the invention, the motor 2 is a three-phase asynchronous motor.

In accordance with a further embodiment, not illustrated in the drawings, the motor can be an asynchronous single phase motor having at least 4-poles.

Figure 7B:
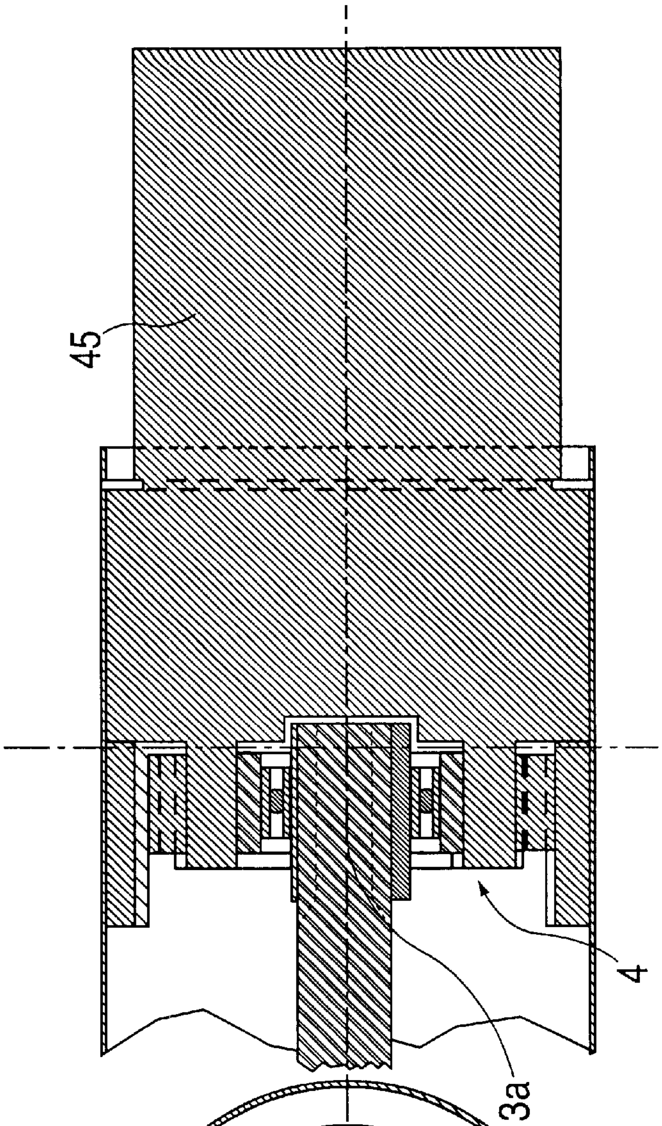
FIGS. 7A and 7B are two enlarged views, respectively in cross and side sections, of the reduction gear unit equipping the control device of FIG. 3.
Figure 7A:
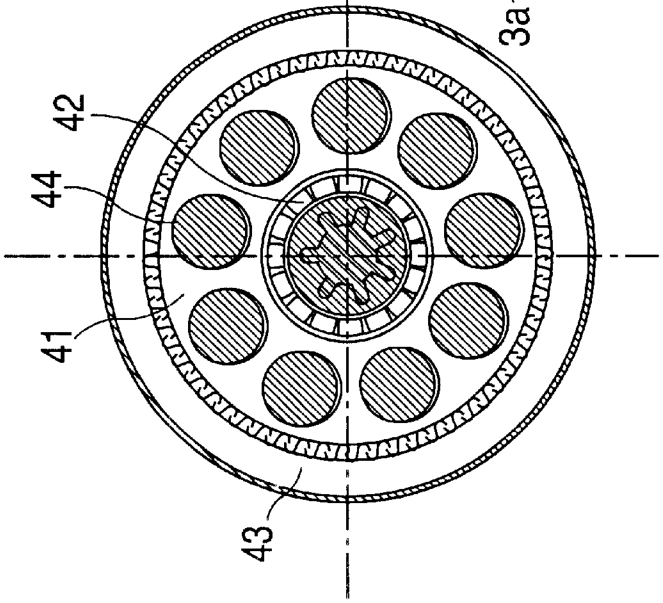
Figure 8:
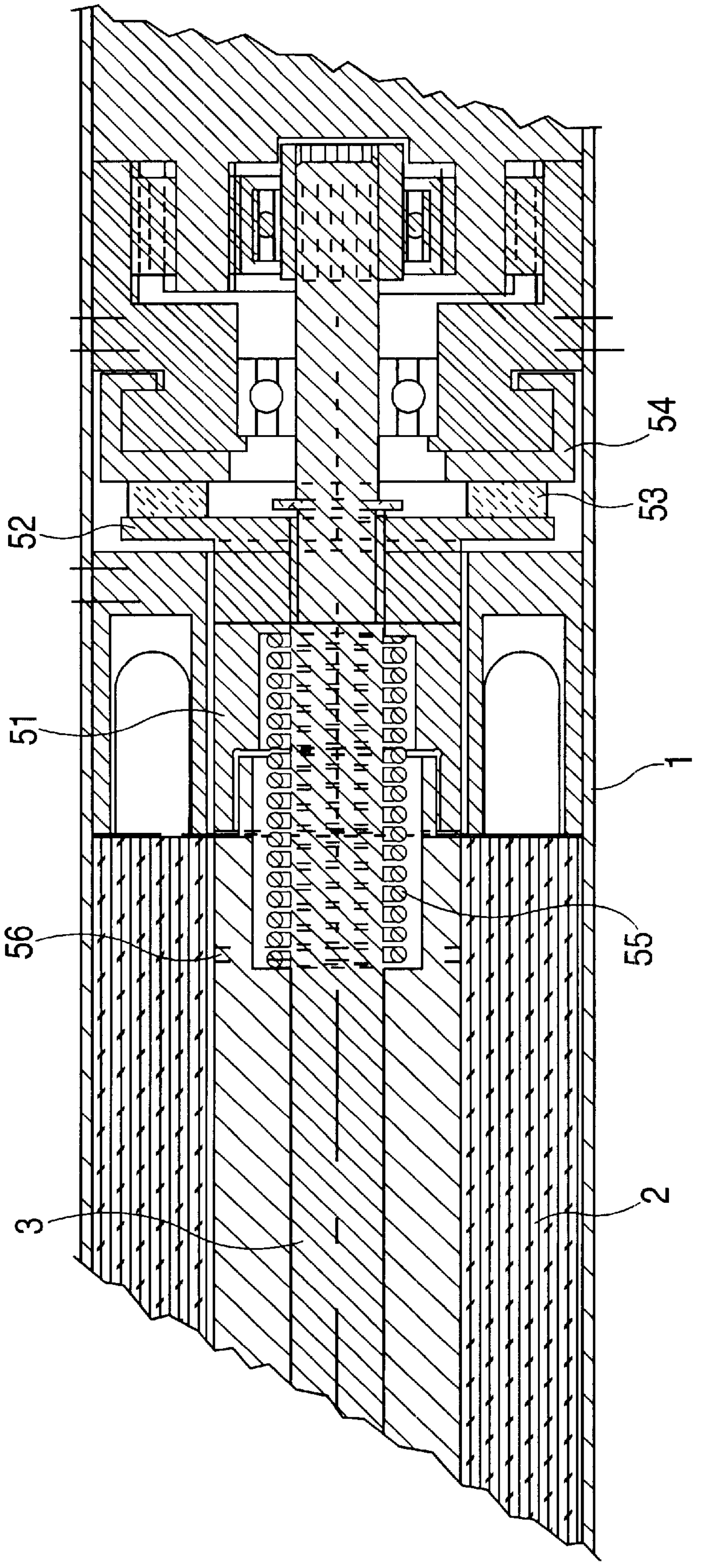
FIG. 8 is an enlarged cross-section side view of the brake unit of the control device shown in FIG. 3.

By using a motor of the above type it becomes possible to use a single-stage reduction gear assembly with a gear ratio of about 1/60–1/80, instead of a multistage reduction gear provided for in the previous devices. According to the invention, a planocentric reduction gear is advantageously employed, such as for example the reduction gear illustrated in detail in FIGS. 7A and 7B.

Such a reduction gear assembly comprises a gear wheel 41 eccentrically and idly mounted on the drive end 3*a* of motor 3, using an interposed ball bearing 42. The gear wheel 41 meshes with the inwardly facing teeth of a stationary internal gear 43 having one tooth more than the number of teeth of the gear wheel 42. When motor 3 rotates, the rotation center of the gear wheel 41 moves along a circumference having its center on the axis of the motor 3 and a radius equal to the eccentricity of said gear wheel, whereby the gear wheel 41 gradually rolls over the ring gear 43. In response to each complete revolution of the motor 2, the gear wheel 41 accomplishes a rotation of one tooth in the opposite direction, rolling on the bearing 42 and thus implementing a rotary movement opposite to the rotation of motor 3 with a gear ratio equal to 1/N where N is the number of teeth on the gear wheel 41.

The reduced rotary movement of the gear wheel 41 is then transmitted to the output shaft 45 of the reduction gear through the end of this latter facing the reduction gear and provided with a plurality of fingers 44 that engage corresponding holes formed in the gear wheel 41.

A planocentric reduction gear of the above illustrated type has a high efficiency and allows to maintain a high overall efficiency of the reduction gear-motor assembly. Moreover such a gear comprises a reduced number of relatively large components and therefore is less subjected to the drawbacks of wear and tear, unreliability and noise of the prior art devices comprising planetary reduction gears.

The brake unit 5 comprises a brake of the flux deviation type. Such a known brake is coaxially positioned to and partially housed within the motor 2, whereby it centrally gets through the shaft 3 of the motor. The brake 5 comprises therefore a mobile part comprising an iron cylinder 51 to one end of which a disk 52 is secured for supporting an annular clutch member 53. In the rest position the cylinder 51—and therefore the clutch member 53 secured thereto—is pushed against a stationary contrast surface 54 by the action of a spring 55 seated in a proper seat 56 formed inside the rotor of motor 2. From an electrical point of view, such a rotor is further modified by carrying out a change in the traditional "squirrel cage" slots to form a short circuit ring 56.

When the motor 2 is not rotated, the spring 55 pushes the clutch member 53 against the contrast surface 54, thus keeping the motor shaft perfectly locked. Conversely, when electric power is supplied to the motor 2, the flux deviator formed by the short circuit ring 56 produces an axial magnetic force that attracts the cylinder 51 against the action of the spring 55, thus allowing the rotation of the motor shaft 3.

Figure 4:
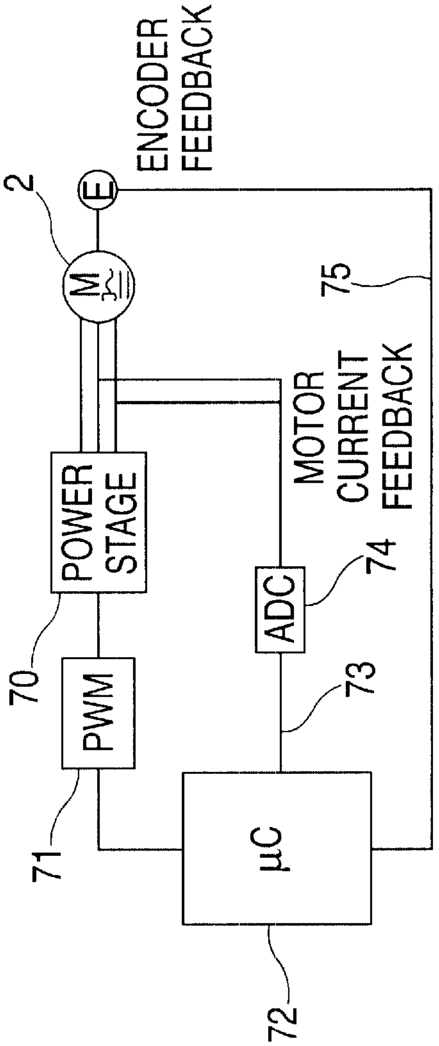
FIG. 4 is a block diagram which illustrates a power supply and management system for the electric motor incorporated in the control device according to the invention.

The electronic power supply and management unit 7 of the motor 2 comprises a number of components connected as shown in FIG. 4. A power stage 70 is fed by single-phase electric power from the mains network and through a rectifier and a three-phase inverter, transforms the incoming AC voltage into a three-phase AC voltage system adapted to feed the motor 2. The three-phase inverter is driven by a Pulse width modulator (PWM) generator 71 which generates a specific signal or waveform for each one of the three phases depending on the information received from a microcontroller 72, by varying both the logical state of the voltage (high/low) and the voltage phase and the duration of the active (high) phase in respect to the inactive (low) phase.

The electrical waveform produced by the inverter, which is directly proportional to the signal emitted by the PWM generator 71 can be adjusted to each one of the three phases in a precise manner. This operation is carried out by the microcontroller 72, which continuously controls and modifies in real time the power output generated by the PWM generator 71 on the basis of a suitable algorithm operating on the following data:

data regarding external reference signals such as the ON/OFF state of the drive controls, the feedback signal of the current signal on the motor 2 (line 73 including the analogic converter 74), and the feedback of the angular position of the shaft 3 of the motor 2 (line 75);

calculated data such as the rotation speed of the shaft 3; and data stored into a non-volatile memory unit (EEPROM) contained in the same microcontroller 72, such as the position of the limit switches, the speed and the steady state torque, the transient gradients and the like.

The algorithm controlling the operation of the microcontroller 72 allows to optimize the efficiency of the motor 2 by approximating in the best way predetermined values of position, speed, torque and current of the motor. The relevant design and calculation method are within the capabilities for a skilled of the art and do not fall within the scope of the present invention. By using this type of electronic control, the motor 2 can reach a very high efficiency, for example up to 90% of the drawn power.

An alternative embodiment provides a reduction of the processing capacity and therefore of the costs of the electronic control. The electronic unit 7 does not provide for a power stage, and the motor 2 is directly fed through the single-phase electrical mains at 220V, by implementing a second or a third fictitious phase through a phase displacement by suitable capacitors. Considering that the maximum input power to the motor usually does not exceed 1 kW, the motor efficiency loss of this embodiment is within 20–30%, and therefore the overall efficiency of the reduction gearmotor assembly can be maintained within the 50–60% of the drawn power, which is acceptably high value when compared with the efficiency of the known devices.

Moreover, by using a three-phase asynchronous motor for the control device of the present invention, a circular rotating magnetic field can be obtained and therefore the motor efficiency is further increased and the operation temperature is decreased when compared with respect to the case of a single-phase asynchronous motor, in which the resulting rotary magnetic field is relatively elliptical due to the dissymmetry of the magnetic fields created by its windings.

Figure 5:
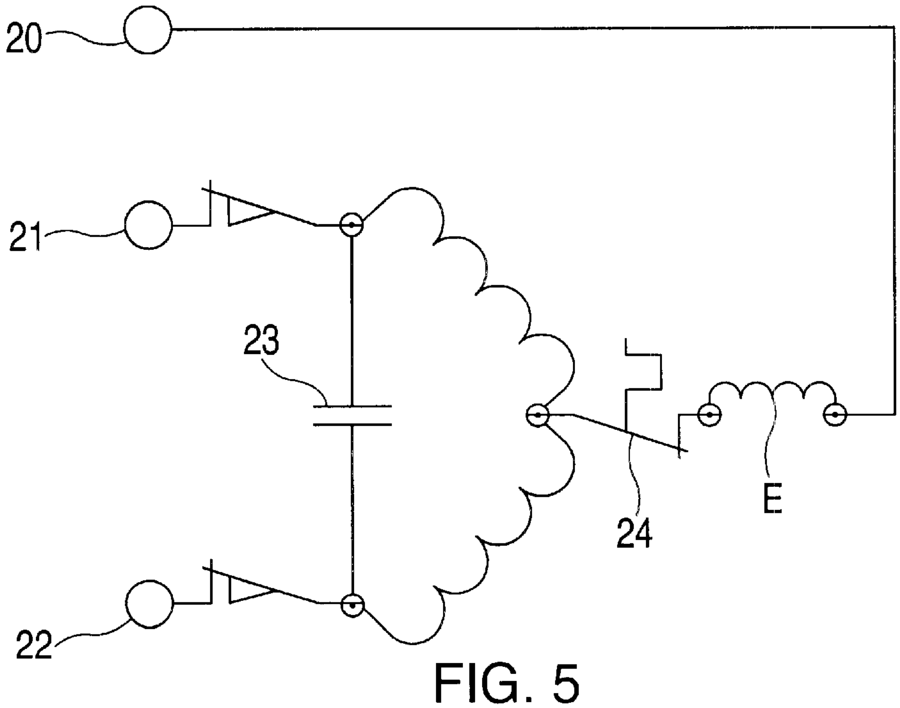
FIG. 5 PRIOR ART
FIG. 5 is a diagram of the electric circuit of a single-phase asynchronous motor used in the known control devices.

As shown in FIG. 5, the motors of the known control devices are single-phase asynchronous motors with two windings. In such motors, the rotation in each direction occurs by feeding the motor rated voltage between the common conductor 20 and one of the two conductors 21 and 22. In such a way, a winding is directly fed (disregarding the voltage drop due to the electrical resistance of the electromagnetic brake winding E connected in series to the common conductor 20), while the other winding is fed through the capacitor 23, and therefore with an out of phase voltage with respect to the voltage of the directly fed winding. The modules of the vectors representing the rotating magnetic fields generated by the two windings are different and therefore, the resulting magnetic field shows a substantially elliptical shape which negatively affects the motor performance.

Figure 6:
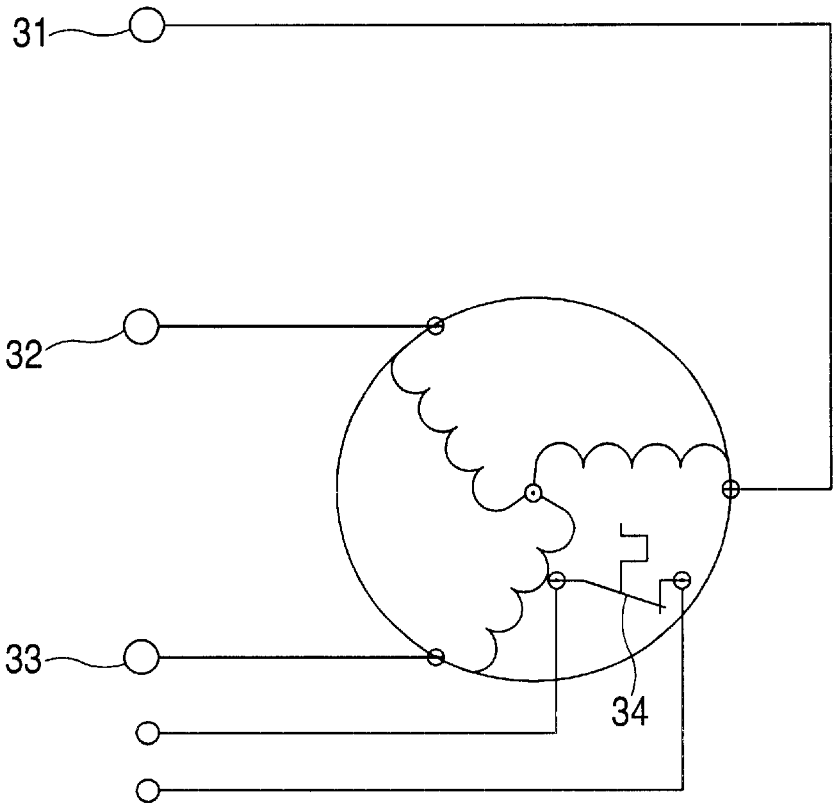
FIG. 6 is a diagram of the electric circuit of a three-phase asynchronous motor used in the control device of the present invention.

Conversely, when using a three-phase asynchronous motor as in the control device of the present invention, the circuit of which is schematically illustrated in FIG. 6, the three phases 31, 32 and 33 are independently fed and are individually controlled. This way the (modules of the) rotating magnetic fields produced by each motor winding can be maintained perfectly equal and the overall resulting magnetic field circular. The achievement of this result is facilitated by the fact that in such a case the feeding of the single windings is not affected by the voltage drop caused by the winding of the electromagnetic brake.

A further advantage of the invention due to the presence of the microcontroller device 72 occurs in the management of the thermal protection switch. In the known control devices, said switch 24 is connected in series with the conductor 20 whereby the operation of the control device is immediately and irremediably interrupted in case of motor overheating. On the contrary, in the control device according to the invention, the thermal protection switch 34 although physically in contact with the windings of the motor 2, is not electrically connected thereto.

Thus the overtemperature information is not used to stop the motor 2, but rather it is forwarded to the controller 72 which can operate in several different manners. For example, controller 72 will:

a) reduce the speed and/or the torque applied, b) emit an alarm signal.

This allows the device using the motor to continue operating in case of overheating, although at a reduced power level, or degree.

In accordance with the invention the motor 2 preferably provides for a minimum number of four poles. As a matter of fact, a 4-pole motor allows a rotating speed lower than the speed of the traditional motors without requiring excessive structural complications of the motor and therefore high increase in costs. According to the present invention, three-phase motors having more than four poles can be advantageously employed.

Multiphase motors having a plurality of poles is described in *Electric Systems Theory: An introduction* by Olle I. Elgerd, Library of congress Card number 79-114445, 1971, incorporated herein by reference in its entirety.

From the preceding description, it is evident that the invention fully achieves the pre-established objects by providing a control device for roller shutter winding tubes that exhibits a high efficiency, is relatively noiseless and reliable.

When using a four-pole three-phase asynchronous electric motor, it is possible to obtain the following advantages:

a) the maximum speed of the rotating parts is half of the maximum speed of the traditional devices, with a corresponding reduction of friction, wear and noise level, and b) the overall efficiency of the motor increases remarkably, while the overheating problems of the motor are reduced and the duration of continuous operation can be prolonged whereby, all other performances being the same, a more economical motor and a single-stage reduction gear with a simpler construction can be used in order to achieve a better reliability, a higher overall power efficiency and a drastic reduction of noise level and vibrations.

The improved overall efficiency of the three-phase motor, which even in the above disclosed very simple embodiment reaches the 50–60% of the drawn power (to be compared with the 10–15% of the known single-phase motors) allows a substantial power saving and reduced sizes of the control device, and operating life times up to 6–7 times longer than the ones of the control devices currently on the market.

All documents and references cited herein, including, but not limited to patents, texts and/or articles, are incorporated by reference in their entirety.

Although presented in exemplary fashion employing specific embodiments, the disclosed structures are not intended to be so limited. Those skilled in the art will also appreciate that numerous changes and modifications could be made to the embodiment described herein without departing in any way from the invention. For example, the number of phases and/or poles associated with the motor drive can be increased to further reduce the RPM of the motor, thus minimizing the complexity and cost of the gear drive. While the controller for the motor has pulse width modulated output, amplitude modulation of the output can also be used to advantage in this invention. The controller, having a microprocessor, memory and input/output capability can perform other functions, such as self test of the motor/drive unit, and is not limited to the examples given. These changes and modifications and all obvious variations of the disclosed embodiment are intended to be embraced by the claims to the limits set by law.

I claim:

1. A control device for rotating a tube supporting a roller member to be wound onto or unwound from said tube, said device comprising at least an electric motor housed in said supporting tube and drive means comprising a reduction gear unit for transmitting the rotation from said motor to said supporting tube, wherein said electric motor is a three phase asynchronous electric motor comprising at least four poles and said drive means comprises a single stage mechanical reduction gear.

2. A control device as claimed in claim 1 wherein said control device incorporates an electronic unit for supplying electric power in a controlled manner to said motor.

3. A control device as claimed in the claim 2, wherein said electronic unit comprises a power stage in which a single-phase waveform is transformed through a rectifier and an inverter into a three-phase system for feeding said motor, said inverter being driven by a Pulse Width Modulated generator controlled by a microcontroller in accordance with an algorithm processing detected data, calculated data and stored data, said stored data being stored in a non-volatile memory unit, and in that said detected data comprise the ON/OFF state of the drive control signals, the feedback of the current signal on the motor and the feedback of the angular position of the motor shaft.

4. A control device as claimed in claim 3, wherein said calculated data comprise the speed of the motor shaft, and that said stored data comprise the limit switch positions, the steady state speed and torque, the transient gradients.

5. A control device as claimed in claim 4, wherein it comprises a thermal protection switch, whose circuit is fed in parallel to the motor and directly controlled by said electronic unit.

6. A control device as claimed in the claim 1, wherein said single stage mechanical reduction gear is a planocentric reduction gear comprising a ring gear provided with a given number of teeth, eccentrically and idly mounted on the output shaft of said motor and connected to the output shaft of said reduction gear, said gear wheel meshing with the internal teeth of a stationary ring gear, the number of said internal teeth being greater than said given number number of teeth on said ring gear by one tooth.

7. A control device as claimed in claim 1, said control device further comprising an eddy-current brake of the flux deviation type, coaxial to and partially housed inside of said motor, and an angular position detector secured to a shaft extension of said motor, said angular position detector being an optical encoder.

8. A control device as claimed in claim 1, wherein said control device has an eddy current brake device of the flux deviation type comprising a mobile part consisting of an iron cylinder, to the end of which a disk is fastened for supporting an annular clutch member pushed against a stationary contrast surface by a spring seated in a seat formed in the rotor of said motor, said rotor having a short circuit ring.

9. A control device as claimed in claim 1, said control device further comprising an eddy-current brake of the flux deviation type, coaxial to and partially housed inside of said motor, and an angular position detector secured to a shaft extension of said motor, said angular position detector being a magnetic encoder.

* * * * *